(12) United States Patent
Sharma et al.

(10) Patent No.: US 9,619,703 B2
(45) Date of Patent: Apr. 11, 2017

(54) METHOD AND SYSTEM FOR GEO-DEMOGRAPHIC CLASSIFICATION OF A GEOGRAPHICAL REGION

(71) Applicant: Tata Consultancy Services Limited, Mumbai (IN)

(72) Inventors: Monika Sharma, Gurgaon (IN); Hiranmay Ghosh, Gurgaon (IN); Kiran Francis, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 27 days.

(21) Appl. No.: 14/872,231

(22) Filed: Oct. 1, 2015

(65) Prior Publication Data

US 2016/0300105 A1 Oct. 13, 2016

(30) Foreign Application Priority Data

Apr. 10, 2015 (IN) .......................... 1515/MUM/2015

(51) Int. Cl.
*G06K 9/00* (2006.01)
*G06K 9/62* (2006.01)
*G06K 9/46* (2006.01)
*G06K 9/52* (2006.01)
*G06T 7/00* (2017.01)
(Continued)

(52) U.S. Cl.
CPC ....... *G06K 9/00476* (2013.01); *G06K 9/0063* (2013.01); *G06K 9/4652* (2013.01); *G06K 9/52* (2013.01); *G06K 9/6218* (2013.01); *G06K 9/6267* (2013.01); *G06K 9/6293* (2013.01); *G06T 7/0028* (2013.01); *G06T 7/408* (2013.01); *G06T 7/60* (2013.01); *G06K 2009/4666* (2013.01); *G06T 11/00* (2013.01); *G06T 2207/20032* (2013.01); *G06T 2207/30181* (2013.01)

(58) Field of Classification Search
CPC ............. G06K 9/6293; G06K 9/00476; G06K 9/6267; G06K 9/6218; G06K 9/52; G06K 9/4652; G06K 2009/4666; G06K 9/0063; G06T 2207/20032; G06T 7/60; G06T 7/408; G06T 7/0028; G06T 11/00; G06T 2207/30181
USPC ........................................................ 382/113
See application file for complete search history.

(56) References Cited

U.S. PATENT DOCUMENTS

2012/0066065 A1 3/2012 Switzer
2015/0032541 A1 1/2015 Haddad et al.
2015/0036874 A1 2/2015 Gueguen

OTHER PUBLICATIONS

Oleksandr Kit, "Automated identification of slums in Hyderabad using high resolution satellite imagery", Dissertation, 2013, Berlin (103 pages).*

(Continued)

*Primary Examiner* — Gregory F Cunningham
(74) *Attorney, Agent, or Firm* — Shumaker, Loop & Kendrick, LLP

(57) ABSTRACT

A method and system is provided for geo-demographic classification of a geographical region. The present application discloses an unsupervised learning method and system for analyzing satellite imagery and multimodal sensory data in fusion for geo-demographic clustering. The present application also discloses an inexpensive and faster method and system for geo-demographic classification of a geographical region.

20 Claims, 2 Drawing Sheets

(51) Int. Cl.
　　　$G06T\ 7/40$　　　(2017.01)
　　　$G06T\ 7/60$　　　(2017.01)
　　　$G06T\ 11/00$　　(2006.01)

(56) References Cited

OTHER PUBLICATIONS

Leen-Kiat Soh, "A General Model for Designing Unsupervised Segmentation Techniques in Image Analysis," A technical report of the Networking and Distributed Systems (NDS) Laboratory, The University of Kansas Center for Research Inc., Aug. 1998, USA (41 pages).*

* cited by examiner

METHOD AND SYSTEM FOR GEO-DEMOGRAPHIC CLASSIFICATION OF A GEOGRAPHICAL REGION

CROSS-REFERENCE TO RELATED APPLICATIONS AND PRIORITY

The present application claims priority from Indian Patent Application No. 1515/MUM/2015, filed on Apr. 10, 2015, the entirety of which is hereby incorporated by reference.

TECHNICAL FIELD

The present application generally relates to the classification of a geographical region. Particularly, the application provides a method and system for geo-demographic classification of a geographical region. More particularly, the application provides a method and system for geo-demographic classification of a geographical region using big multimedia and multimodal data consisting of satellite imagery and other sensory data.

BACKGROUND

A typical populated geographical region such as a city may be divided into numerous quarters. Different quarters of the geographical region may have people of different socio-economic backgrounds living therein, and the basic assumption is that neighborhoods in any given geographical region generally exhibits similar human activity patterns, such as similar lifestyles and spending habits. Over the recent past, demographic clustering of such geographical region have been explored in various application dimensions such as urban planning, market research, targeted advertising and setting up of commercial and welfare establishments.

Prior art literature discloses various demographic clustering techniques. A majority of the existing solutions relies on supervised manual efforts, such as door to door surveys, and census data; such as National Readership Survey (NRS) which classifies living population of a particular geographical region based on social grades, age, income and similar information pertaining to such population. Prior art literature also discloses applied geo-demographic segmentation systems, like ACORN, MOSAIC, PSYTE, and Tapestry Segmentation, which are employed to segment the living population based on census data, consumer household and individual data collated from a number of governmental and commercial sources. While using any such conventional techniques, extraction of demographic information is largely dependent on household survey records, transaction data, geo-demographic data, and lifestyle data of population residing in said geographical region. Such manual demographic clustering solution(s) exhibit practical constraints of long turn-around time, investment of significant manpower and money.

While on the other hand, satellite imagery of such a geographical region is routinely employed in various environmental applications pertaining to said geographical region such as monitoring forest coverage, water bodies, urban growth etc. For example, satellite imagery has also been used to identify a particular area as containing slums or no slums. However, the scope of said prior art is confined to distinguishing between slums or no slums. It does not discover other geo-demographic clusters. Satellite imagery has also been used to discover individual structures such as buildings, tents etc. however, said prior art does not focus on finding geographical conglomeration of structures or characteristics of neighborhoods.

Other forms of aggregate neighborhood data, such as multimodal sensory data pertaining to telecommunication, traffic-flow data, postal, social media, weather, and air quality have also been used for geo-demographic classification. Such data signify human activity pattern and has enormous potential of complementing static view of satellite imagery of given geographical region. However, the prior art literature has never explored application of satellite imagery in conjugation with multimodal sensory data in geo-demographic analysis or clustering.

The prior art literature has illustrated application of satellite imagery and multimodal sensory data pertaining to human activity for geo-demographic clustering separately and in a different way. However, use of unsupervised learning methods for analyzing big multimedia and multimodal data including satellite imagery and multimodal sensory data in fusion for geo-demographic clustering is still considered as one of the biggest challenges of the technical domain.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention. In accordance with the present invention, the primary objective is to provide a method and system for geo-demographic classification of a geographical region.

Another objective of the invention is to provide an unsupervised learning method and system for analyzing big multimedia and multimodal data including satellite imagery and multimodal sensory data in fusion for geo-demographic clustering.

Another objective of the invention is to provide an inexpensive method and system for geo-demographic classification of a geographical region.

Yet another objective of the invention is to provide a faster method and system for geo-demographic classification of a geographical region.

Other objects and advantages of the present invention will be more apparent from the following description when read in conjunction with the accompanying figures, which are not intended to limit the scope of the present disclosure.

The present application provides a method and system for geo-demographic classification of a geographical region.

The present application provides an inexpensive and faster and method and system for geo-demographic classification of a geographical region.

The present application provides a computer implemented unsupervised method for geo-demographic classification of at least one geographical region. The method includes pre-processing of a satellite image of said geographical region; dividing pre-processed satellite image of said geographical region into a plurality of blocks; and dividing each block into a plurality of patches for visual characterization of said geographical region; extracting visual features of said plurality of patches; clustering and labeling said plurality of patches using a combination of said extracted visual features; clustering said plurality of blocks based on the distribution of said labeled plurality of patches; removing post clustering noise of satellite image of said geographical region; pre-processing of multimodal sensory data originated from said geographical region; clustering and labeling of pre-processed multimodal sensory data; aligning pre-processed multimodal sensory data with the clustered and labeled satellite image of said geographical region; extracting corresponding labels of aligned multimodal sensory data and the clustered and labeled satellite image of said geographical region; clustering integrated multimodal sensory data with the clustered and labeled satellite image of said geographical region for obtaining geo-demographic classification of said geographical region; and neighborhood labeling the obtained geo-demographic clusters of said geographical region.

The present application provides a system for geo-demographic classification of at least one geographical region. The system (200) including a processor configured to operate a satellite image pre-processing module (202); a satellite image division module (204); a visual feature extraction module (206); a patch clustering and labeling module (208); a block clustering module (210); a noise removing module (212); a multimodal sensory data pre-processing module (214); a multimodal sensory data clustering and labeling module (216); an alignment module (218); a geo-demographic classification module (220); and a neighborhood labeling module (222).

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Figure 1:
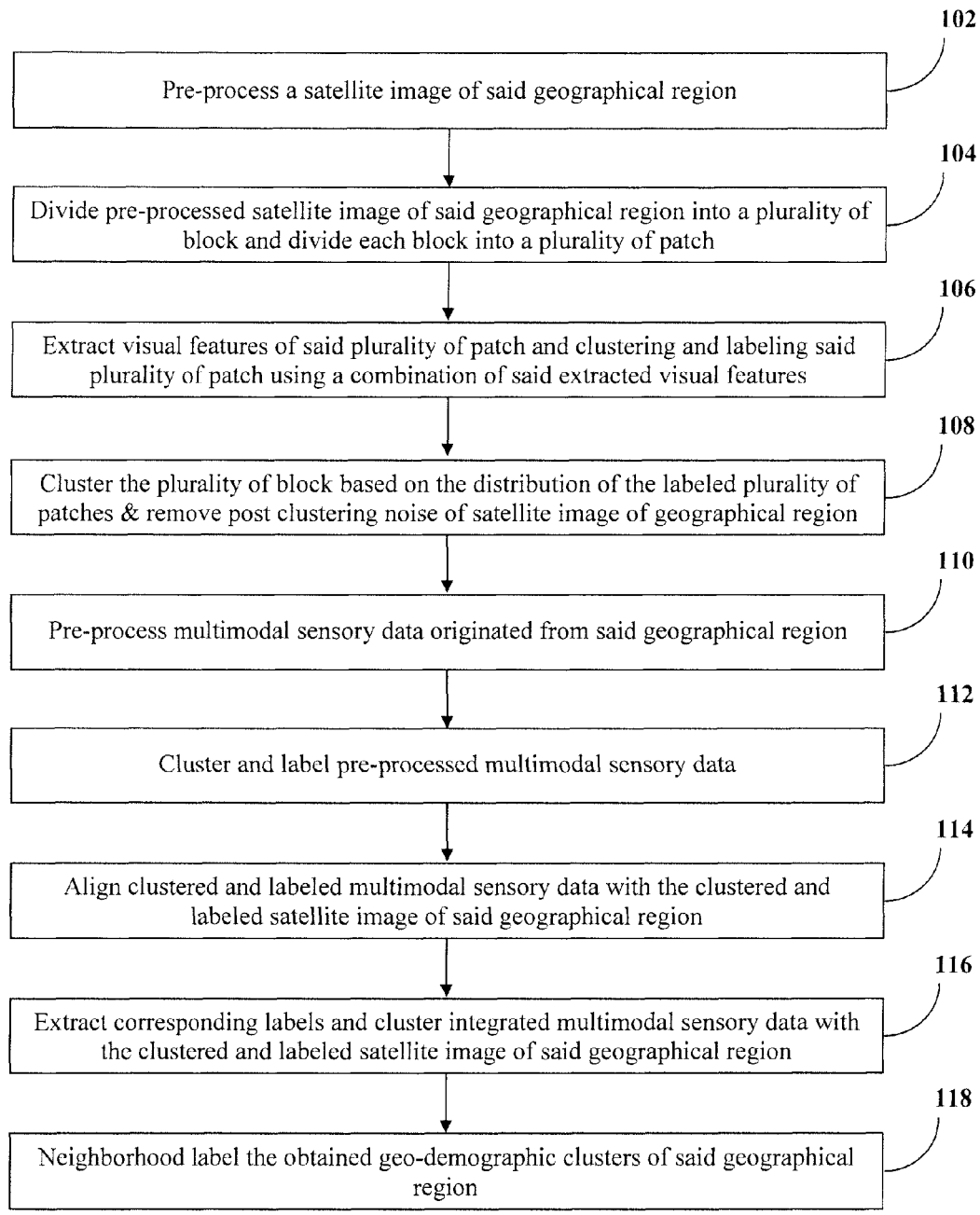
FIG. 1 shows a flow chart illustrating a geo-demographic classification of a geographical region.

The present invention will now be described more fully hereinafter with reference to the accompanying drawings and diagrams in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

The present application provides a computer implemented unsupervised method and system for geo-demographic classification of at least one geographical region. The present application also provides an inexpensive and faster and method and system for geo-demographic classification of a geographical region. More particularly, the application provides a method and system for geo-demographic classification of a geographical region using big multimedia and multimodal data consisting of satellite imagery and other sensory data Referring to FIG. 1 is a flow chart illustrating a geo-demographic classification of a geographical region.

The process starts at step 102, a satellite image of said geographical region is pre-processed. At step 104, the pre-processed satellite image of said geographical region is divided into a plurality of blocks; and further dividing each block into a plurality of patches for visual characterization of said geographical region. At step 106, visual features of said plurality of patches are extracted and said plurality of patches are clustered and labeled using a combination of said extracted visual features. At step 108, said plurality of blocks are clustered based on the distribution of said labeled plurality of patches and post clustering noise of satellite image of said geographical region are removed. At step 110, multimodal sensory data originated from said geographical region is pre-processed. At step 112, pre-processed multimodal sensory data is clustered and labeled. At step 114, clustered and labeled multimodal sensory data is aligned with the clustered and labeled satellite image of said geographical region. At the step 116, corresponding labels of aligned multimodal sensory data and the clustered and labeled satellite image of said geographical region are extracted and integrated multimodal sensory data is clustered with the clustered and labeled satellite image of said geographical region for obtaining geo-demographic classification of said geographical region. The process ends at step 118 in which the obtained geo-demographic clusters of said geographical region are neighborhood labeled. The neighborhood category labels are selected from a group including, but not limited, to residential, commercial, open-land, densely-populated, and slums. A sample set of plurality of blocks of obtained geo-demographic clusters are assigned neighborhood category labels manually and subsequently, the neighborhood category labels of the geo-demographic clusters are determined based on the majority vote of the constituting labeled sample blocks.

Figure 2:
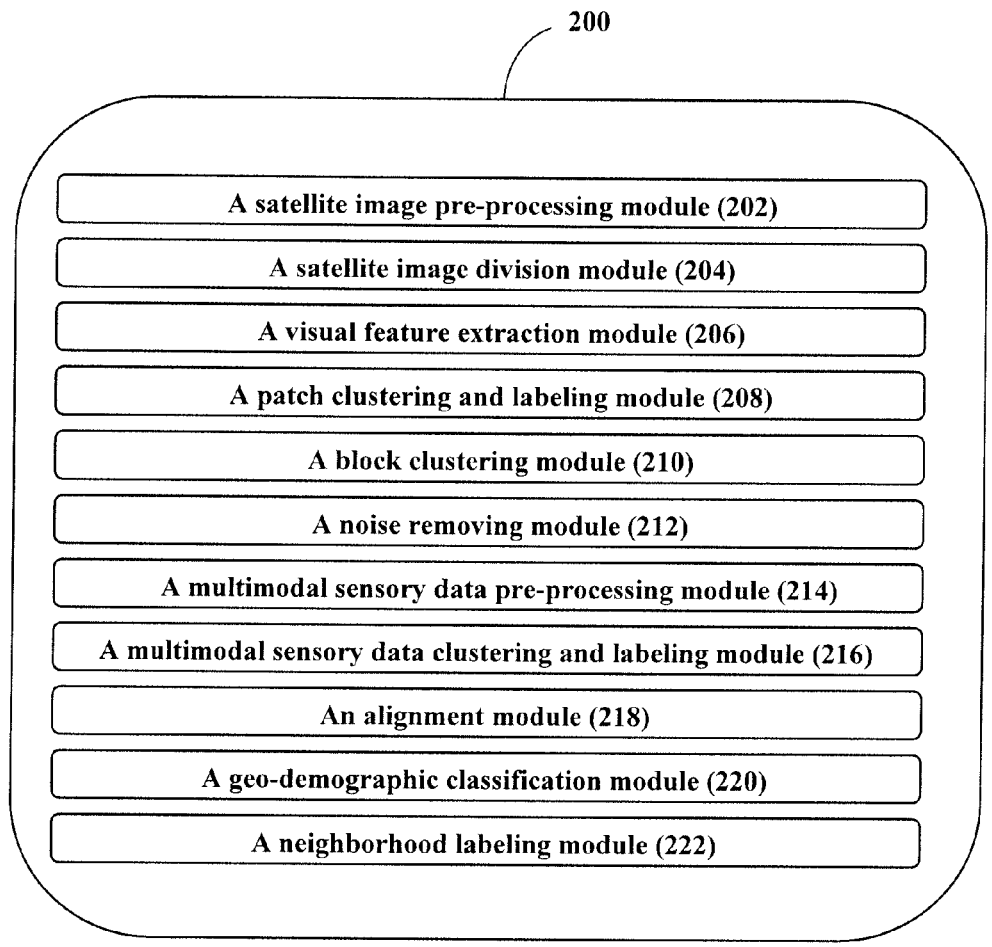
FIG. 2 shows a block diagram illustrating system architecture for geo-demographic classification of a geographical region.

Referring to FIG. 2, FIG. 2 is a block diagram depicting system architecture for geo-demographic classification of a geographical region.

In an embodiment of the present invention, a system is provided for geo-demographic classification of at least one geographical region. The application provides a system for geo-demographic classification of said geographical region using big multimedia and multimodal data consisting of satellite imagery and other sensory data.

The system (200) includes a processor configured to operate a satellite image pre-processing module (202); a satellite image division module (204); a visual feature extraction module (206); a patch clustering and labeling module (208); a block clustering module (210); a noise removing module (212); a multimodal sensory data pre-processing module (214); a multimodal sensory data clustering and labeling module (216); an alignment module (218); a geo-demographic classification module (220); and a neighborhood labeling module (222).

The satellite image of the geographical region such as a city shows different entities, such as built-ups, roads, trees, parks and open land. Such entities may exist in different proportions and configurations in different demographic localities. For an example, an affluent locality is likely to include more greenery and wider roads, a planned housing colony may be characterized with periodicity of patterns whereas an urban village is likely to show a larger concentration of buildings in random orientations. The present invention exploits such patterns in geo-demographic classification of the geographical region. The similar patterns may have different semantics in different cities, it is assumed that a pattern is likely to have a uniform connotation in a particular geographical region which can be used for geo-demographic classification of the geographical region.

In another embodiment of the present invention, the satellite image pre-processing module (202) is adapted for pre-processing of a satellite image of said geographical region. The satellite image pre-processing module (202) is utilized for noise removal of satellite image of said geographical region. The satellite image of said geographical region is of resolution in the range of 0.15-1 m/pixel. The satellite image of said geographical region, in an example is of resolution 52 cm/pixel. The satellite image of said geographical region is pre-processed using a filter selected from a group including, but not limited to, Gaussian Filter and Median Filter.

In another embodiment of the present invention, the satellite image division module (204) is adapted for dividing pre-processed satellite image of said geographical region into a plurality of blocks. Each block out of the plurality of blocks should be adequately large to statistically reflect the character of said geographical region. At the same time, each block out of the plurality of blocks should not be too large to subsume different types of neighborhoods. Out of a range of different block sizes, block size range of 100 m to 200 m found square to be optimal. Some of the blocks out of the plurality of blocks may fall across the boundaries of adjacent neighborhoods. The gradual change in neighborhood characteristics does not exhibit much effect. However, for neighborhoods separated by natural boundaries such as a river, a highway or a green belt have to be given due consideration. The plurality of blocks are in the range of 128-2048 pixels× 128-2048 pixels size in the image domain and corresponding geographical area covered by said block is in the range of 100-200 meter square.

In an exemplary embodiment of the present invention, the satellite image of said geographical region is of resolution 52 cm/pixel, the plurality of blocks are of 256×256 pixels size in the image domain. The plurality of blocks are in the image domain corresponds to 130×130 sqm of said geographical region.

In another embodiment of the present invention, the satellite image division module (204) divides each block into a plurality of patches for visual characterization of said geographical region. Each block out of the plurality of blocks may contain a variety of entities such as buildings, vegetation and corresponding aggregate visual features may not convey meaningful insight. The plurality of patches are in the range of 15-50 pixels×15-50 pixels size and corresponding geographical area covered by said patch is in the range of 2-50 meter square.

In an exemplary embodiment of the present invention, the plurality of patches are selected of 20×20 pixels size corresponding to 10×10 sqm of said geographical region as an elementary area to be visually characterized. The plurality of patches may be mutually exclusive or partially overlapping. Consequently, a particular block out of plurality of blocks mat contain a finite number of patches.

In another embodiment, the present invention provides a two-step process. In the first step, visual features such as color and texture of said plurality of patches are extracted using the visual feature extraction module (206) and further said plurality of patches are clustered and labeled using a combination of said extracted visual features using the patch clustering and labeling module (208). Each patch out of the plurality of patches are characterized by a particular label that represents the cluster it belongs to. Each block out of the plurality of blocks may include a plurality of patch with different labels. In the second step, said plurality of blocks are clustered based on the distribution of said labeled plurality of patches. The two-step multi-resolution clustering enables characterizing macroscopic blocks with visual features observed on microscopic patches.

In another embodiment of the present invention, the visual feature extraction module (206) is adapted for extracting visual features of said plurality of patches. In general, there may be three classes of visual features of said plurality of patches color, texture and shape. Since there is no definite shape for the constituent elements in any particular patch, each patch out of the plurality of patches is characterized with color and texture features.

In a preferred embodiment of the present invention, the color features are selected from a group including but not limited to Hue Saturation Value Histograms (HSVH), RGB histograms. The color features characterize the plurality of patches with their color-contents.

In a preferred embodiment of the present invention, rotation-independent texture descriptors are selected from a group including but not limited to Rotation invariant Local Binary Patterns (RLBP), Histogram of Gradient Magnitudes (HGM) and Rotation invariant Histograms of Oriented Gradients. In the satellite image of the geographical region, visible edges that mark the different objects, such as buildings, may be differently oriented without any difference in their semantics, thereby rotation invariant texture descriptors are preferred over rotation-sensitive texture-descriptors, such as Local Binary Patterns (LBP) and HOG etc.

In another embodiment of the present invention, a combination of color, rotation-sensitive and rotation-independent texture features are used.

In another embodiment of the present invention, the patch clustering and labeling module (208) is adapted for clustering and labeling said plurality of patches using a combination of said extracted visual features. The plurality of patches are clustered using the extracted visual features.

In a preferred embodiment of the present invention, the plurality of patches are clustered using an approximate clustering technique, since the geographical region may have a very large number of image patches it becomes difficult to apply conventional clustering techniques. A sample set of data-points are clustered using conventional clustering technique. Once the sampled data points are clustered, each of the data points in the dataset are assigned to one of the clusters using shortest distance approach. Thereby labeling each of the plurality of data points with a label corresponding to the cluster that it belongs to.

In an exemplary embodiment of the present invention, the plurality of randomly sampled patches are clustered using canopy clustering followed by K-means clustering. The canopy clustering helps in arriving at an optimal value of k with reduced computational complexity before the actual clustering with K-means algorithm takes place. For all the extracted visual features, "histogram intersection" has been used as the similarity measure, which is equivalent to using "Manhattan Distance" as the distance-measure and has a lower computational complexity than computing Euclidean distances. Once the sampled patches are clustered, each of the patches constituting the geographical region are assigned to one of the clusters using shortest distance approach. Thereby labeling each of the plurality of patches with a label corresponding to the cluster that it belongs to.

In another embodiment of the present invention, the use of multiple visual features may provide with two integration options, early integration and late integration. In early integration, all feature vectors are concatenated and clustering is done based on the combined features, wherein the features are merged at the current stage of processing and a patch out of plurality of patches are characterized with a single label. In late integration, patch clustering is done with individual features, wherein feature integration is deferred to a later stage of processing and a patch out of plurality of patches is characterized with multiple labels at the end.

In a preferred embodiment of the present invention, the early integration is adopted, as to reduce the data dimensionality for later stages of processing. The early integration not only improves processing speed but also alleviates noise. The different combinations of rotation sensitive and rotation-invariant features have been experimented and it has been observed that the combination of rotation-invariant features is most suitable for geo-demographic classification of the geographical region.

In another embodiment of the present invention, the block clustering module (210) is adapted for clustering said plurality of blocks based on the distribution of said labeled plurality of patches. Since, each block out of the plurality of blocks consists of the plurality of patches each bearing a label. Thus, each block is characterized by the statistics of the patch labels. A histogram of patch labels for each block out of the plurality of blocks is used as its feature descriptor, the plurality of blocks are clustered using approximate clustering. Each block out of the plurality of blocks is labeled with a unique identifier for the cluster that it belongs to.

In another embodiment of the present invention, the noise removing module (212) is adapted for removing post clustering noise of satellite image of said geographical region. Singularities in a locality of the geographical region and spanning of blocks across such localities may introduce some noise in the clustering process. A voting based smoothening is utilized to remove the noise. The final label of each block out of the plurality of blocks is determined by the majority vote of the block and the eight blocks geographically surrounding it.

In an exemplary embodiment of the present invention, the vote of the central block is given a weight of 2, while those for the surrounding blocks are given weights of 1.

In another embodiment, the present invention provides a two-step process. In the first step, visual features such as color and texture of said plurality of patches are extracted using the visual feature extraction module (206) and further said plurality of patches are clustered and labeled using a combination of said extracted visual features using the patch clustering and labeling module (208). Each patch out of the plurality of patches is characterized by a particular label that represents the cluster it belongs to. Each block out of the plurality of blocks may include a plurality of patches with different labels. In the second step, said plurality of blocks are clustered based on the distribution of said labeled plurality of patches. The two-step multi-resolution clustering enables characterizing macroscopic blocks with visual features observed on microscopic patches.

In another embodiment of the present invention, the satellite image of the geographical region and its classification results in different neighborhoods based on the visual features and patterns present in the satellite imagery pertaining to said geographical region. The discovered geo-demographic classification may further be optimized by incorporating multimodal sensory data pertaining to said geographical region. Wherein, the multimodal sensory data includes of data depicting human-activities selected from a group including, but not limited to, of telecommunication, traffic-flow data, postal, social media, weather, and air quality.

In another embodiment of the present invention, the multimodal sensory data pre-processing module (214) is adapted for pre-processing of multimodal sensory data originated from said geographical region. The multimodal sensory data includes data depicting human activities, such as telecommunications data, traffic flow data, postal, social media, weather, and air quality data captured through sensors from said geographical region.

In another embodiment of the present invention, the multimodal sensory data clustering and labeling module (216) is adapted for clustering and labeling of pre-processed multimodal sensory data. The integrated multimodal sensory data and the clustered and labeled satellite image of said geographical region is clustered using a plurality of clustering techniques selected from a group including, but not limited to, similarity join method.

In another embodiment of the present invention, the alignment module (218) is adapted for aligning clustered and labeled multimodal sensory data with the clustered and labeled satellite image of said geographical region. The alignment module (218) performs linear scaling of the clustered and labeled multimodal sensory data in order to overlap perfectly with the clustered and labeled satellite image of said geographical region. Alignment of clustered and labeled multimodal sensory data with the clustered and labeled satellite image of said geographical region is required when clustered and labeled multimodal sensory data and the clustered and labeled satellite image of said geographical region is available at different resolutions.

In another embodiment of the present invention, the geo-demographic classification module (220) is adapted for extracting corresponding labels of aligned multimodal sensory data and the clustered and labeled satellite image of said geographical region; and clustering integrated multimodal sensory data with the clustered and labeled satellite image of said geographical region for obtaining geo-demographic classification of said geographical region.

In another embodiment of the present invention, the neighborhood labeling module (222) is adapted for assigning neighborhood category labels to the obtained geo-demographic clusters of said geographical region.

In an exemplary embodiment of the present invention, neighborhood category labels are selected from a group including but not limited to residential, commercial, open-land, densely-populated, and slums. A sample set of plurality of blocks of obtained geo-demographic clusters are assigned neighborhood category labels manually and subsequently, the neighborhood category labels of the geo-demographic clusters are determined based on the majority vote of the constituting labeled sample blocks.

In an exemplary embodiment of the present invention, a computer implemented unsupervised method for geo-demographic classification of at least one geographical region is provided, wherein at least one geographical region being an Urban region is selected. For example, this Urban region is Milan, Italy. Milan, Italy spans an area of 23.5 km×23.5 km and is located between 9°00'41" and 9° 18'45.7" N latitudes and 45°34'06" and 45°21'22" E longitudes. The satellite image of Milan is used at resolution of 41.8 cm/pixel. The satellite image of Milan is pre-processed using a satellite image pre-processing module (202), wherein the satellite image of Milan is pre-processed using Gaussian filter with a kernel size of 3×3 for noise removal. The preprocessed satellite image of Milan is divided into 221×221 blocks i.e., 48841 blocks. Further, each block is divided into a plurality of patches for visual characterization of Milan using a satellite image division module (204), wherein a patch out of plurality of patches covers an area of approx. 8 m×8 m containing 7 million patches. The total number of pixels in the Milan satellite image are 3.2 billion. Visual features of said plurality of patches are extracted using a visual feature extraction module (206) and clustering and labeling said plurality of patches using a combination of said extracted visual features using a patch clustering and labeling module (208). The visual features of said plurality of patches are based on color and texture and selected from a group including but not limited of Hue Saturation Value Histogram (HSVH), Rotation Invariant Local Binary Patterns (RLBP), and Histogram of Gradient Magnitudes (HGM). The plurality of blocks are clustered based on the distribution of said labeled plurality of patches using a block clustering module (210). Further, post clustering noise of the Milan satellite image is removed using noise removing module (212). The plurality of patches and said plurality of blocks are clustered using canopy clustering followed by K-means clustering. The classification results depicts the similar neighborhood pattern as is visible in the Milan city satellite image. The unsupervised geo-demographic classification partitions Milan into different zones without neighborhood labeling the discovered zones in an inexpensive, faster and easier way. Multimodal sensory data originated from Milan is pre-processed using the multimodal sensory data pre-processing module (214). The multimodal sensory data includes of data depicting human-activities selected from a group including but not limited to of telecommunication, traffic-flow data, postal, social media, weather, and air quality. For Milan, telecommunication data is used, which is publically available for months of November and December 2013 by Telecom Italia Big Data Challenge. The telephone call intensity was used as one of the experimental parameter out of the telecommunication data provided by Telecom Italia for the geo-graphical region of Milan. The Telecommunication Data from the Milan urban area is spatially arranged over a grid of 100×100 called the Milan grid, where a single cell of the grid represents an area of 235 m×235 m. The telecommunication data is temporally aggregated for a period of 10 minutes. A real number is used to represent the directional strength of the telephone calls of a cell in the grid. The Telecom data set constitutes of two sub-data sets:
1) Milan to Milan: Contains calls made within the cells of Milan grid.
2) Milan to provinces: Contains calls between the cells of Milan grid and outside provinces.

The total, including Milan to Milan and Milan to Provinces outgoing calls for the cells of Milan grid is used during the month of November 2013. This is aggregated for every 60 minute time span to obtain a feature vector of dimension 24 per day. The mean feature vector over the week days from Monday to Friday is found and is concatenated with the mean feature vector over the weekends to obtain 48 dimensional feature vectors. A total of 10000 feature vectors, each of 48 dimensions are generated for the 100×100 Milan grids.

Thereby, total number of data-items processed is around 86 million. The generated feature vectors are clustered and labeled using the multimodal sensory data clustering and labeling module (216). The generated feature vectors may be clustered using canopy clustering followed by K-means clustering to obtain 50 clusters. The clustering output of telecommunication data illustrates similar geo-demographic pattern as depicted in classification results in the Milan satellite image.

The clustered and labeled multimodal sensory data, which is telecommunication data of Milan is aligned with the clustered and labeled satellite image of Milan using the alignment module (218). The integrated multimodal sensory data and the clustered and labeled satellite image of Milan is clustered using similarity join method. For fusion of the clustered and labeled multimodal sensory data, which is telecommunication data of Milan and the clustered and labeled satellite image of Milan, the satellite images of Milan is clustered based on concatenation of HGM and RLBP feature-vectors. In the clustering output, each block is represented as a square of 24×24 pixels. For aligning the clustered and labeled multimodal sensory data, which is telecommunication data of Milan represented by cells of Milan grid and the clustered and labeled satellite image of Milan, each labeled cells of Milan grid is represented as 53×53 pixels square. The Milan square size is calculated as follows:

$$\text{Milan Square Size} = \frac{24 * \text{No. of Block-Rows of Satellite Maps}}{\text{No. of Grid-Rows of Milan}}$$

Upon calculating, Milan square size was found out to be 53×53 pixels. Thus, the results of both data is represented in the form of image at the same scale such that each pixel of satellite results image corresponds to the pixel at same position in the telecommunication data results.

The corresponding labels of aligned multimodal sensory data and the clustered and labeled satellite image of Milan are extracted using the geo-demographic classification module (220). The labels of both the image-pixels are extracted, satellite image results and telecommunication data results and represented the image as follows:

$$CI_{i,j} = \{p_{i,j}, q_{i,j}\}$$

$CI_{i,j}$ is the combined feature-representation of pixel (I, j) and p and q are the labels of clusters of satellite image data and telecommunication data respectively.

Since, CI feature-vectors are symbolic labels rather than any quantities. There is a need to cluster these labels based on the similarity of such labels. Similarity between two CI feature vectors is calculated as:

$$Sim_{m,n} = \frac{num(CI_m \cap CI_n)}{dim(CI)}$$

Where $Sim_{m,n}$ is the similarity between CI of $m_{th}$ and $n_{th}$ feature, num $(CI_m \cap CI_n)$ means number of corresponding matches in $CI_m$ and $CI_n$ features, dim(CI) is the dimensionality of CI. In present experiment, dim(CI)=2.

The integrated multimodal sensory data and the clustered and labeled satellite image of Milan is clustered using similarity join method. The clustering of integrated multimodal sensory data with the clustered and labeled satellite image of Milan is done for obtaining geo-demographic classification of Milan using the geo-demographic classification module (220).

The similarity join method is used for clustering symbolic labels based on the similarity. It is observed that the clustered and labeled multimodal sensory data, which is telecommunication data of Milan has enhanced the classified, clustered and labeled satellite image of Milan. Thus, integration of the clustered and labeled multimodal sensory data, which is telecommunication data of Milan with the clustered and labeled satellite image of Milan provides clues about the type of locality.

Further, the obtained geo-demographic clusters of said geographical region are neighborhood labeled using the neighborhood labeling module (222). The obtained or discovered geo-demographic clusters of said geographical region are neighborhood labeled, wherein a certain number of random samples of said discovered geo-demographic clusters are labeled manually with neighborhood category labels selected from a group including but not limited to residential, commercial, open-land, densely-populated, and slums. Thereafter, neighborhood category labels are assigned to the remaining said discovered geo-demographic clusters based on the majority vote of the constituting labeled sample blocks.

What is claimed is:

1. A computer implemented unsupervised method for geo-demographic classification of at least one geographical region; said method comprising:
   pre-processing of a satellite image of said geographical region using a satellite image pre-processing module;
   dividing pre-processed satellite image of said geographical region into a plurality of blocks; and dividing each block into a plurality of patches for visual characterization of said geographical region using a satellite image division module;
   extracting visual features of said plurality of patches by employing a two-step process using a visual feature extraction module and clustering and labeling said plurality of patches using a combination of said extracted visual features using a patch clustering and labeling module;
   clustering said plurality of blocks based on the distribution of said labeled plurality of patches using a block clustering module;
   removing post clustering noise of satellite image of said geographical region using a noise removing module;
   pre-processing of multimodal sensory data originated from said geographical region using a multimodal sensory data pre-processing module;
   clustering and labeling of pre-processed multimodal sensory data using a multimodal sensory data clustering and labeling module;
   aligning clustered and labeled multimodal sensory data with the clustered and labeled satellite image of said geographical region using an alignment module;
   extracting corresponding labels of aligned multimodal sensory data and the clustered and labeled satellite image of said geographical region; and
   clustering integrated multimodal sensory data with the clustered and labeled satellite image of said geographical region for obtaining geo-demographic classification of said geographical region using a geo-demographic classification module; and
   neighborhood labeling the obtained geo-demographic clusters of said geographical region using a neighborhood labeling module.

2. The method of claim 1, wherein the satellite image of said geographical region is pre-processed using a filter selected from a group comprising of Gaussian Filter and Median Filter.

3. The method of claim 1, wherein the satellite image of said geographical region has a resolution in the range of 0.15-1 m/pixel.

4. The method of claim 1, wherein the plurality of blocks are in the range of 128-2048 pixels×128-2048 pixels size in the image domain and corresponding geographical area covered by said block is in the range of 100-200 meter square.

5. The method of claim 1, wherein the plurality of patches are in the range of 15-50 pixels×15-50 pixels size and corresponding geographical area covered by said patch is in the range of 2-50 meter square.

6. The method of claim 1, wherein the visual features of said plurality of patches are based on color and texture and selected from rotation-invariant feature-descriptors.

7. The method of claim 1, wherein said plurality of patches and said plurality of blocks are clustered using approximate clustering.

8. The method of claim 1, wherein the multimodal sensory data comprises of data depicting human-activities comprising at least one of a telecommunication, traffic-flow data, postal, social media, weather, and air quality.

9. The method of claim 1, wherein integrated multimodal sensory data and the clustered and labeled satellite image of said geographical region is clustered using similarity join method.

10. The method of claim 1, wherein a neighborhood category label is assigned to each of the obtained geo-demographic clusters of said geographical region, wherein the neighborhood category label is residential, commercial, open-land, densely-populated, slums, or any combination thereof.

11. A system for geo-demographic classification of at least one geographical region; said system comprising: a processor and
 a satellite image pre-processing module adapted for pre-processing of a satellite image of said geographical region;
 a satellite image division module adapted for dividing pre-processed satellite image of said geographical region into a plurality of blocks; and dividing each block into a plurality of patches for visual characterization of said geographical region;
 a visual feature extraction module adapted for extracting visual features of said plurality of patches by employing a two-step process;
 a patch clustering and labeling module adapted for clustering and labeling said plurality of patches using a combination of said extracted visual features;
 a block clustering module adapted for clustering said plurality of blocks based on the distribution of said labeled plurality of patches;
 a noise removing module adapted for removing post clustering noise of satellite image of said geographical region using;
 a multimodal sensory data pre-processing module adapted for pre-processing of multimodal sensory data originated from said geographical region;
 a multimodal sensory data clustering and labeling module adapted for clustering and labeling of pre-processed multimodal sensory data;
 an alignment module adapted for aligning clustered and labeled multimodal sensory data with the clustered and labeled satellite image of said geographical region;
 a geo-demographic classification module adapted for extracting corresponding labels of aligned multimodal sensory data and the clustered and labeled satellite image of said geographical region; and clustering integrated multimodal sensory data with the clustered and labeled satellite image of said geographical region for obtaining geo-demographic classification of said geographical region; and
 a neighborhood labeling module adapted for neighborhood labeling the obtained geo-demographic clusters of said geographical region.

12. The system of claim 11, wherein the satellite image of said geographical region is pre-processed using a filter selected from a group comprising of Gaussian Filter and Median Filter.

13. The system of claim 11, wherein the satellite image of said geographical region has a resolution in the range of 0.15-1 m/pixel.

14. The system of claim 11, wherein the plurality of blocks are in the range of 128-2048 pixels×128-2048 pixels size in the image domain and corresponding geographical area covered by said block is in the range of 100-200 meter square and the plurality of patches are in the range of 15-50 pixels×15-50 pixels size and corresponding geographical area covered by said patch is in the range of 2-50 meter square.

15. The system of claim 11, wherein the visual features of said plurality of patches are based on color and texture and selected from rotation-invariant feature-descriptors.

16. The system of claim 11, wherein said plurality of patches and said plurality of blocks are clustered using approximate clustering.

17. The system of claim 11, wherein the multimodal sensory data comprises of data depicting human-activities comprising at least one of a telecommunication, traffic-flow data, postal, social media, weather, and air quality.

18. The system of claim 11, wherein the integrated multimodal sensory data and the clustered and labeled satellite image of said geographical region is clustered using similarity join method.

19. The system of claim 11, wherein the neighborhood labeling module is adapted for assigning a neighborhood category label to each of the obtained geo-demographic clusters of said geographical region, wherein the neighborhood category label is residential, commercial, open-land, densely-populated, slums, or any combination thereof.

20. A non-transitory computer readable medium comprising program codes executable by at least one processor for unsupervised method for geo-demographic classification of at least one geographical region, the program codes comprising:
 a program code for pre-processing of a satellite image of said geographical region;
 a program code for dividing pre-processed satellite image of said geographical region into a plurality of blocks; and dividing each block into a plurality of patches for visual characterization of said geographical region;
 a program code for extracting visual features of said plurality of patches by employing a two-step process using a visual feature extraction module (206) and clustering and labeling said plurality of patches using a combination of said extracted visual features;

a program code for clustering said plurality of blocks based on the distribution of said labeled plurality of patches;
a program code for removing post clustering noise of satellite image of said geographical region;
a program code for pre-processing of multimodal sensory data originated from said geographical region;
a program code for clustering and labeling of pre-processed multimodal sensory data;
a program code for aligning clustered and labeled multimodal sensory data with the clustered and labeled satellite image of said geographical region;
a program code for extracting corresponding labels of aligned multimodal sensory data and the clustered and labeled satellite image of said geographical region; and clustering integrated multimodal sensory data with the clustered and labeled satellite image of said geographical region for obtaining geo-demographic classification of said geographical region; and
a program code for neighborhood labeling the obtained geo-demographic clusters of said geographical region.

* * * * *